United States Patent
Giron et al.

(10) Patent No.: US 8,102,585 B2
(45) Date of Patent: Jan. 24, 2012

(54) FUNCTIONALIZED SECURITY GLAZING

(75) Inventors: Jean-Christophe Giron, Aachen (DE); Juergen Schuett, Aachen (DE); Xavier Fanton, Aulnay-sous-Bois (FR); Fabien Beteille, Revel (FR)

(73) Assignee: Saint-Gobain Glass France, Courbevoie (FR)

( * ) Notice: Subject to any disclaimer, the term of this patent is extended or adjusted under 35 U.S.C. 154(b) by 629 days.

(21) Appl. No.: 10/564,501

(22) PCT Filed: Jul. 15, 2004

(86) PCT No.: PCT/FR2004/001862
§ 371 (c)(1),
(2), (4) Date: Jul. 5, 2006

(87) PCT Pub. No.: WO2005/007398
PCT Pub. Date: Jan. 27, 2005

(65) Prior Publication Data
US 2007/0020442 A1    Jan. 25, 2007

(30) Foreign Application Priority Data
Jul. 16, 2003 (FR) .................................. 03 08648

(51) Int. Cl.
*G02F 1/15* (2006.01)

(52) U.S. Cl. ........ 359/265; 359/266; 359/270; 359/273; 359/432; 359/275; 429/304; 349/16; 428/432; 428/212

(58) Field of Classification Search .................. 359/265, 359/275; 349/16; 428/432, 212; 219/203
See application file for complete search history.

(56) References Cited

U.S. PATENT DOCUMENTS

| | | | |
|---|---|---|---|
| 4,654,067 A | | 3/1987 | Ramus et al. |
| 4,874,229 A | * | 10/1989 | Ito et al. .................. 359/275 |
| 5,202,787 A | * | 4/1993 | Byker et al. ................. 359/267 |
| 5,239,406 A | | 8/1993 | Lynam |
| 5,694,144 A | * | 12/1997 | Lefrou et al. ................ 345/49 |
| 5,985,486 A | | 11/1999 | Giron |
| 6,248,263 B1 | * | 6/2001 | Tonar et al. ................. 252/583 |
| 6,277,523 B1 | | 8/2001 | Giron |
| 6,284,360 B1 | * | 9/2001 | Johnson et al. ............ 428/317.7 |
| 6,294,233 B1 | * | 9/2001 | Barth et al. ................. 428/34 |
| 6,337,758 B1 | | 1/2002 | Beteille et al. |

(Continued)

FOREIGN PATENT DOCUMENTS

BE     702 812     2/1968

(Continued)

OTHER PUBLICATIONS

U.S. Appl. No. 10/563,322, filed Jan. 4, 2006, Giron, et al.

(Continued)

*Primary Examiner* — Angela Ortiz
*Assistant Examiner* — Michael Nelson
(74) *Attorney, Agent, or Firm* — Oblon, Spivak, McClelland, Maier & Neustadt, L.L.P.

(57) ABSTRACT

Glazing assembly, comprising in succession:
a first rigid substrate (S1),
a second rigid substrate (S2),
at least one active system (3) comprising at least one film and placed between the substrates (S1 and S2),
at least one polymer film (f1) having the function of retaining fragments of the glazing assembly should it break, the said film being placed between the substrate (S1) and the substrate (S2), characterized in that the active system (3) is on the inner face (2) of the substrate (S1).

20 Claims, 3 Drawing Sheets

U.S. PATENT DOCUMENTS

| | | |
|---|---|---|
| 6,362,914 B2 * | 3/2002 | Baumann et al. ............ 359/265 |
| 6,529,308 B2 | 3/2003 | Beteille et al. |
| 6,746,775 B1 | 6/2004 | Boire et al. |
| 6,747,779 B1 | 6/2004 | Morin et al. |
| 6,791,737 B2 | 9/2004 | Giron |
| 6,872,453 B2 | 3/2005 | Arnaud et al. |
| 6,940,628 B2 | 9/2005 | Giron |
| 7,002,720 B2 | 2/2006 | Beteille et al. |
| 7,012,728 B2 | 3/2006 | Morin et al. |
| 2002/0037421 A1 | 3/2002 | Arnaud et al. |
| 2003/0064198 A1 | 4/2003 | Thomsen et al. |
| 2004/0053125 A1 | 3/2004 | Giron et al. |
| 2004/0067343 A1 | 4/2004 | Beteille et al. |
| 2004/0169789 A1 | 9/2004 | Mathey et al. |
| 2004/0229049 A1 | 11/2004 | Boire et al. |
| 2005/0041276 A1 | 2/2005 | Beteille et al. |
| 2005/0147825 A1 | 7/2005 | Arnaud et al. |
| 2006/0033978 A1 | 2/2006 | Morin et al. |

FOREIGN PATENT DOCUMENTS

| | | |
|---|---|---|
| EP | 0 353 141 | 1/1990 |
| EP | 0 753 438 | 1/1997 |
| FR | 2 227 123 | 11/1974 |
| FR | 2 829 723 | 3/2003 |
| JP | 03 115142 | 5/1991 |

OTHER PUBLICATIONS

U.S. Appl. No. 10/562,451, filed Dec. 27, 2005, Baubet, et al.
U.S. Appl. No. 10/562,121, filed Dec. 23, 2005, Baubet, et al.

* cited by examiner

FUNCTIONALIZED SECURITY GLAZING

The present invention relates to glazing having two characteristics:

firstly, glazing called safety glazing, in the sense that it is capable of retaining fragments (especially glass fragments) in the event of breakage. This relates especially to glazing assemblies according to European standard ECE R43 or American standard ANSI Z26.1. Preferably, such glazing assemblies successfully pass the two tests described in these standards by the terms "ball drop" and "phantom drop". The most usual configuration of such glazing assemblies is that of standard laminated glazing, consisting of two essentially transparent (generally glass) rigid substrates between which a sheet of thermoplastic polymer is placed, this sheet ensuring that the glass fragments are retained in the event of breakage.

As is known, lamination generally requires the three assembled elements to be heated, generally with pressure, so as to soften the thermoplastic sheet and to make it adherent, and possibly to remove the residual air between the various elements of the glazing.

It may also be laminated glazing in which the interlayer sheet is based on a one-sided or two-sided adhesive polymer of the elastomer type, which avoids the abovementioned hot-lamination operation.

It also includes safety glazing in which the fragment-retention function is obtained by a plastic film, especially one consisting of the superposition of a thermoplastic sheet of the polyvinyl butyral type and of a sheet of protective polymer, of the polyethylene terephthalate (PET) type, which is made to adhere to a rigid substrate of the glass type. Such plastic film is, for example, sold by DuPont de Nemours under the name " "SPALLED SHIELD, or under other brand names by 3M or by Southwall. This polymer sheet may optionally be transparent to electromagnetic radiation. The same applies to the product sold by 3M, which is an assembly consisting of a complex of at least two thermoplastic sheets f'1 and f"1, the nature and the thicknesses of each of these sheets possibly being different depending on the desired applications; and secondly, the glazing according to the invention is "functionalized" in the sense that it has at least one functionality conferred on it by one or more thin films and/or one or more discontinuous elements that may be of organic, inorganic or organic-inorganic hybrid nature (these films or elements generally being placed against one of the rigid substrates of the glazing according to the invention). They will be denoted hereafter by the term "active system(s)". The glazing according to the invention may have one or more active systems.

The first types of active system useful for the invention are in general electrochemical systems, and more particularly electrically controllable systems of the glazing type having variable energy and/or optical properties.

The electrically controllable systems make it possible in particular to obtain glazing of which it is possible to modify, at will, the darkening/degree of vision or of filtration of thermal/solar radiation. This is, for example, viologen-based glazing, which allows the transmission or absorption of light to be controlled, as described in U.S. Pat. No. 5,239,406.

Electroluminescent systems convert electrical energy directly into light, one example being described in Patent FR-2 770 222.

The invention also applies to devices using electrochromic systems, operating in transmission or in reflection.

Examples of electrochromic systems are described in U.S. Pat. No. 5,239,406 and EP-612 826.

Electrochromic systems have been very widely studied. As is generally known, they comprise two layers of electrochromic material separated by an electrolyte and flanked by two electrodes. Each of the electrochromic layers, under the effect of an electrical supply, can inject charges reversibly, the modification in their oxidation state as a result of such injection/ejections resulting in a modification in their optical and/or thermal properties (for example, in the case of tungsten oxide, a switch from a blue colour to a colourless appearance).

It is conventional to put electrochromic systems into three categories:

that in which the electrolyte is in the form of a polymer or a gel, for example a proton-conductive polymer, such as those described in Patents EP-253 713 or EP-670 346, or a lithium-ion-conductive polymer such as those described in Patents EP-382 623, EP-518 754 and EP-532 408, the other layers of the system generally being inorganic in nature;

that in which all the layers are essentially inorganic. This category is often termed an "all-solid-state" system; examples of such may be found in Patent EP-867 752, EP-831 360, French Patent Application FR-2 791 147 and French Patent Application FR-2 781 084; and that in which all the layers are based on polymers, which category is often noted by the term "all-polymer" system.

There are also systems called "optical valves": these are polymer-based films in which microdroplets are arranged, these microdroplets containing particles capable of adopting a preferred orientation under the action of an electric field. An example of this is described in Patent WO 93/09460.

There are also liquid-crystal systems, with a mode of operation similar to the above systems: they use, placed between two conductive layers, a polymer film in which liquid-crystal droplets are dispersed, especially nematic liquid crystals with a positive dielectric anisotropy. When the film is under tension, the liquid crystals are oriented along a preferred axis, which allows vision. With no voltage, the film becomes diffusing. Examples of these are described in Patents EP-88 126, EP-268 877, EP-238 164, EP-357 234, EP-409 442 and EP-964 288. Mention may also be made of cholesteric liquid-crystal polymers, such as those described in Patent WO 92/19695, and liquid-crystal systems that switch with a variation in light transmission $T_L$.

A second type of active system to which the invention applies relates to layers or multilayers, the properties of which change without an electrical supply, under the effect of heat or light: mention may be made of thermochromic layers, especially those based on vanadium oxide (an example of which is given in French Patent FR 2 809 388), thermotropic layers and photochromic layers.

Also possibly involved are photovoltaic systems that convert light energy into electrical energy.

Within the context of the present invention and throughout the text, the term "layer" must be understood in its broadest sense: it may equally well be made of mineral materials and organic-type materials, most particularly polymers, which may be in the form of polymer films or even gel films. This is especially the case with thermotropic gels, for example, those described in Patents EP-639 450, U.S. Pat. No. 5,615,040, WO 94/20294 and EP-878 296.

Another type of active system to which the invention applies relates to layers or multilayers having solar-control or low-emissivity properties, especially those based on one or more metal layers, or on metal oxide layers sandwiched by dielectric layers. These multilayers may be deposited on one of the rigid substrates or may be deposited on a flexible substrate of the PET (polyethylene terephthalate) type, which is placed between two sheets of thermoplastic polymer of the PVB (polyvinyl butyral) type, which joins the two rigid glass-type substrates together. Examples of these may be found in Patents EP-638 528, EP-718 250, EP-724 955, EP-758 583 and EP-847 965.

Finally, mention may also be made of coatings with an acoustic function (acoustic attenuation) or an optical (decorative, absorbent, etc.) function.

It is not simple to devise glazing assemblies having the above two characteristics, since the combination of an active system and polymer sheets having a fragment-retaining function in glazing creates additional constraints. Thus, if an active system, for example an electrochromic system, is interposed in a conventional laminated glazing assembly between the glass and the inserted polymer film, there is a tendency for the adhesion of the polymer film to the glass to decrease. There is therefore an increased risk that, should the glazing break, the glass fragments can no longer be predominantly retained by the polymer film, as the standards so require.

If, to avoid this, the active system is placed on one of the outer faces of a standard laminated glazing assembly (on face 1 or face 4, using the conventional numbering system, the rules of which are recalled below: the substrate in contact with the outside is called first substrate S1 and the substrate in contact with the inside is called second substrate S2; for a laminated substrate: face 1=that face of the first substrate which faces towards the outside; face 2=that face of the first substrate which is directed towards the inside; face 3=that face of the second substrate which is directed towards the outside and faces the face 2; face 4=that face of the second substrate which is directed towards the inside), means must therefore be provided in order to protect it from any contact with the ambient atmosphere and to protect it from chemical or mechanical degradation. This therefore requires the use of an additional protective substrate (i.e. a three-glass system). However, a number of applications require the glazing to have a nominal thickness, and it is not always possible to offer (excessively) thick glazing. This is especially the case for sunroofs of motor vehicles, in which the bodymakers generally install laminated or toughened glass panes, the overall thickness of which may not exceed about 5 mm. This is also the case for roof windows for example, in which the window frame allows the fitting only of windows having a predefined thickness, and one that is often imposed by the thermal insulation performance to be achieved.

To obviate this protection problem, the active system is generally inserted between the two substrates. This incorporation between the two substrates generates other problems that the incorporators seek to minimize, or even eliminate.

In general, the active system is incorporated on face 3 of the substrate assembly before the lamination operation and after the bending and/or toughening operation (when, of course, the substrates have to undergo a bending and/or toughening operation).

However, the incorporation of an active system on face 3 of a laminated substrate, the substrates of which have individually undergone a bending operation, generates other drawbacks that the present invention aims to remedy.

This is because incorporation of the active system on face 3 of the assembly is in fact carried out on that face of the second substrate which has been in contact with the members that have caused the bending. As a consequence of this contact between the members needed for the bending operation and that face of the substrate in question, surface defects are inevitably created on the face of the substrate in question.

These surface defects may result in delamination problems at the interface between the active system and face 3 of the substrate, this delamination possibly resulting in irreversible deterioration of the complete glazing assembly.

The present invention therefore aims to alleviate these drawbacks by proposing a glazing assembly containing an active system of simplified structure.

The subject of the invention is therefore a glazing assembly comprising, in succession: a first rigid substrate; a second rigid substrate; at least one active system comprising at least one layer and placed between the first and second substrates; and at least one polymer film having the function of retaining the fragments of the glazing assembly in the event of it breaking, the said film being placed between the first substrate and the second substrate, which glazing assembly is characterized in that the active system is on the inner face of the first substrate.

Thanks to the positioning of the active system on face 2 of the first substrate, it is possible to produce safety glazing assemblies.

In preferred embodiments of the invention, one or more of the following arrangements may optionally also be employed:

the active system is an electrically controllable system having variable optical and/or energy properties, of the electrochromic system, optical valve, viologen-based system, liquid-crystal system or electroluminescent system type;

the first and second substrates are made of glass;

it includes at least one sheet of thermoplastic polymer (f1), with the function of retaining fragments of the glazing assembly should it break, between the two substrates;

the total thickness ($e_{1+2}$) of the two substrates and of all the materials that can be placed between them is less than or equal to 8 mm, especially less than or equal to 5.5 mm, preferably between 2 mm and 5 mm;

the total thickness ($e_{1+2}$) of the two substrates and of all the materials that can be placed between them is less than or equal to 30 mm, preferably between 6 mm and 25 mm;

the two substrates have substantially identical shapes and substantially identical dimensions;

the two substrates have different dimensions and substantially identical shapes;

it is provided with an opacifying peripheral coating, of the screen-printed type, especially around the periphery of the inner face of the first substrate and/or the periphery of the outer or inner face of the second substrate;

it is provided with at least a first peripheral seal in contact with the facing faces of the substrates;

it is provided with at least a second peripheral seal in contact with the edges of the substrates;

the first and/or second peripheral seal(s) is (are) attached or obtained by extrusion or obtained by encapsulation;

the second peripheral seat, or at least one of them if there are more than one, is flush with the outer face of the first substrate;

the first and/or second peripheral seal, or at least one of them if there are more than two seals, at least partly fills an open peripheral groove defined by a recess between the two substrates; and the first and/or second peripheral seal is penetrated by connection elements of the active system and/or at least partly contains mechanical reinforcement elements.

The subject of the invention is also, more particularly, the embodiment in which the glazing assembly is a laminated glazing assembly, with at least two glass substrates S1, S2 joined together by lamination, which is provided with an active system preferably placed on face 2 (of the substrate S1). It is therefore the thermoplastic sheet between the substrates S1 and S2 that mainly provides the safety function (retention of fragments in the event of breakage).

The subject of the invention is any of the applications of the glazing assemblies described above, especially in buildings, as a roof window or curtain wall, and for the motor vehicle industry, as a sunroof (which may or may not open), side windows, rear windows, or part of a windscreen.

The subject of the invention is also a motor vehicle thus equipped, preferably with the glazing assembly or assemblies according to the invention flush with the body.

The invention will now be described in detail with the aid of non-limiting examples illustrated by the following figures.

In the appended drawings, certain elements may be represented on a larger or smaller scale than in reality, so as to make it easier to understand the figure.

Figure 2:
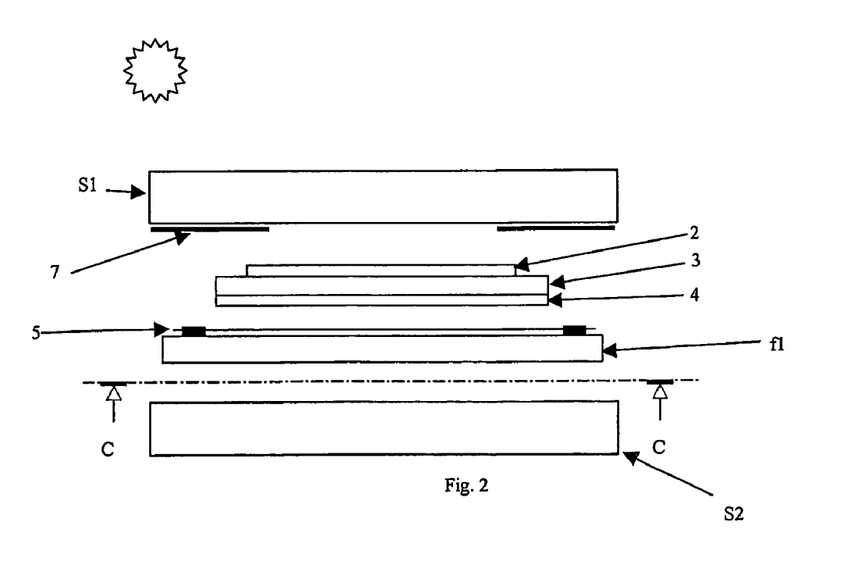
FIG. 2 is a sectional view on AA of FIG. 1.
Figure 3:
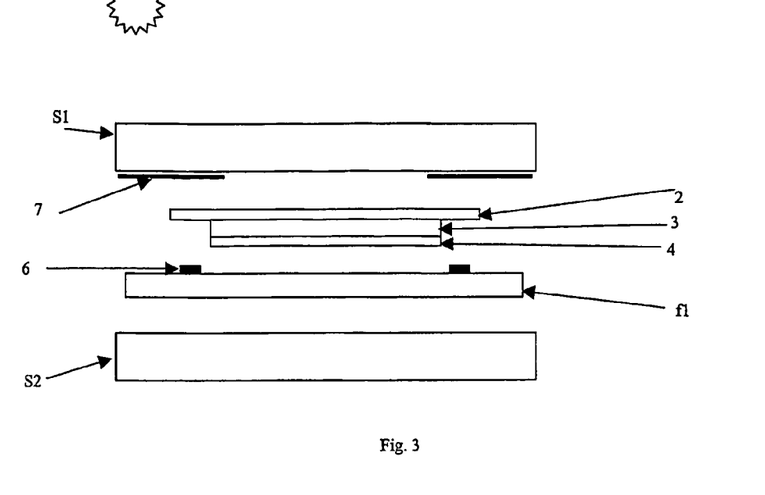
FIG. 3 is a sectional view on BB of FIG. 1.

The example illustrated by FIGS. 2 and 3 relates to a motor-vehicle sunroof 1. It comprises in succession, from the outside towards the interior of the passenger compartment, two glass panes S1, S2, which are made of silica-soda-lime clear glass (but they may also be tinted), respectively 2.1 mm and 2.1 mm in thickness for example.

The glass panes S1 and S2 are of the same size and of rectangular overall shape. Their dimensions are 900×500 mm$^2$. The glass pane S1 is also partly covered around the periphery with an enamel 7, deposited by a known screen-printing technique.

The glass pane S1 shown in FIGS. 2 and 3 includes, on face 2, a thin-film multilayer of the all-solid-state electrochromic type.

The glass pane S1 is laminated to the glass pane S2 via a thermoplastic sheet f1 made of polyurethane (PU) 0.8 mm in thickness (it may be replaced with a sheet of ethylene/vinyl acetate (EVA) or polyvinyl butyral (PVB)).

The all-solid-state electrochromic thin-film multilayer includes an active multilayer 3 placed between two current collectors 2 and 4. The collector 2 is intended to be in contact with the face 2. A first array of conducting wires 5 (visible in FIG. 1) or an equivalent device allows electric current to be brought to the collector 4; a second array of conducting wires 6 (also visible in FIG. 1) or an equivalent device allows electric current to be brought to the lower collector 2.

The collectors 2 and 4 and the active multilayer 3 may be either substantially of identical size and shape, or substantially of different size and shape, and therefore the paths of the collectors 2 and 4 will be adapted according to the configuration. Moreover, the dimensions of the substrates, particularly S1, may essentially be greater than those of 2, 4 and 3.

The collectors 2 and 4 are of the metal type or of the TCO (transparent conductive oxide) type made of ITO, $F:SnO_2$ or $Al:ZnO$, or may be a multilayer of the TCO/metal/TCO type. Depending on the configuration, they may be omitted, and in this case the current leads 5 and 6 are in direct contact with the active multilayer 3.

A preferred way of producing the collector 2 consists in depositing, on face 2, a 50 nm SiOC first layer surmounted by a 400 nm $F:SnO_2$ second layer (the two layers preferably being deposited in succession by CVD on float glass before cutting).

A second way of producing the collector 2 consists in depositing, on face 2, a bilayer consisting of an optionally doped $SiO_2$-based first layer (the doping especially being with aluminium or boron) approximately 20 nm in thickness surmounted by an ITO second layer approximately 100 to 600 nm in thickness (the two layers preferably being vacuum-deposited in succession, by magnetically enhanced reactive sputtering in the presence of oxygen, optionally carried out hot).

Another way of producing the collector 2 consists in depositing, on face 2, a monolayer made of ITO approximately 100 to 600 nm in thickness (a layer preferably vacuum-deposited by magnetically enhanced reactive sputtering in the presence of oxygen and optionally carried out hot).

The collector 4 is an ITO layer 100 to 500 nm in thickness, also deposited by magnetically enhanced reactive sputtering on the active multilayer.

Figure 1:
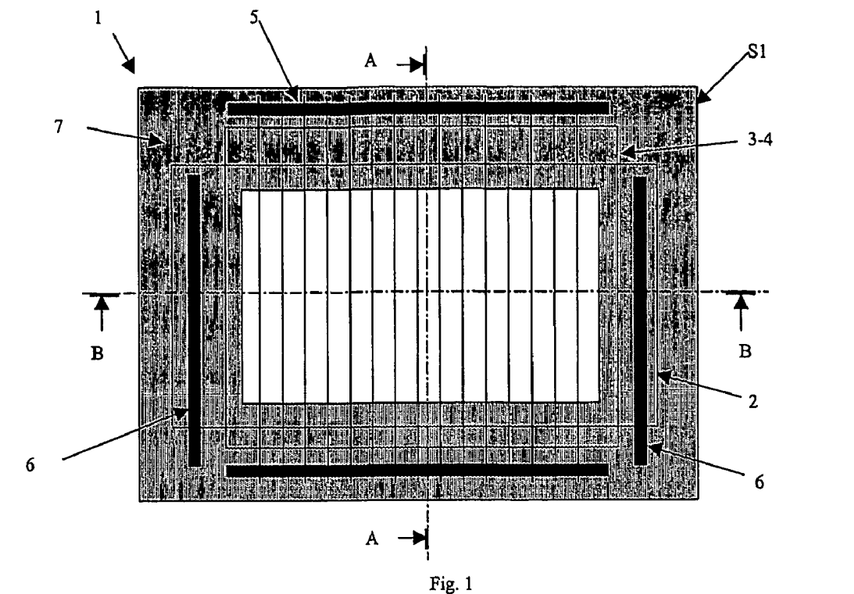
FIG. 1 is a front view of face 2, forming the subject of the invention.

In FIG. 1, the current leads 5 are metal wires associated with metal shims. The metal wires are, for example, made of tungsten (or else copper or molybdenum), these being optionally coated with carbon and partly oxidized, with a diameter of between 10 and 100 μm and preferably between 20 and 50 μm, the said wires being straight or corrugated, and deposited on a sheet of PU by a technique known in the field of wire-heated windscreens, for example that described in Patents EP-785 700, EP-553 025, EP-506 521 and EP-496 669.

One of these known techniques consists in using a heated press roll, which presses the wire onto the surface of the polymer sheet, this press roll being supplied with wire from a feed reel using a wire guide device. The metal shims consist, in a known manner, of copper strips optionally covered with a tin alloy, with a total thickness typically of 50 μm and a width of between 3 and 8 mm.

The current leads in another embodiment are obtained by a screen-printing technique, these being deposited directly on the enamelled regions of face 2. This screen-printed coating, especially based on silver, may also be deposited on the ITO layer. A conductive paste may also serve for supplying current and, in this case, it is in contact with the ITO layer or with the enamel layer present on face 2.

The active multilayer 3 shown in FIGS. 2 and 3 is made up as follows:

- a layer of anodic electrochromic material made of hydrated iridium oxide 40 to 100 nm in thickness (it may be replaced with a layer of hydrated nickel oxide 40 to 300 nm in thickness), possibly alloyed with other metals;
- a layer of tungsten oxide 100 nm in thickness;
- a layer of hydrated tantalum oxide or of hydrated silica oxide or hydrated zirconium oxide 100 nm in thickness; and
- a layer of cathodic electrochromic material based on hydrated tungsten oxide 370 nm in thickness.

Moreover, the glazing assembly shown in FIGS. 1, 2 and 3 incorporates, (but not shown in the figures) a first peripheral seal in contact with faces 2 and 3, this first seal being suitable for forming a barrier to external chemical attack.

A second peripheral seal is in contact with the edge of S1, the edge of S2 and face 4, so as to form a barrier, provide a means of mounting the assembly in the vehicle and sealing between the inside and the outside, providing an aesthetic function and a means of incorporating reinforcement elements.

Figure 4:
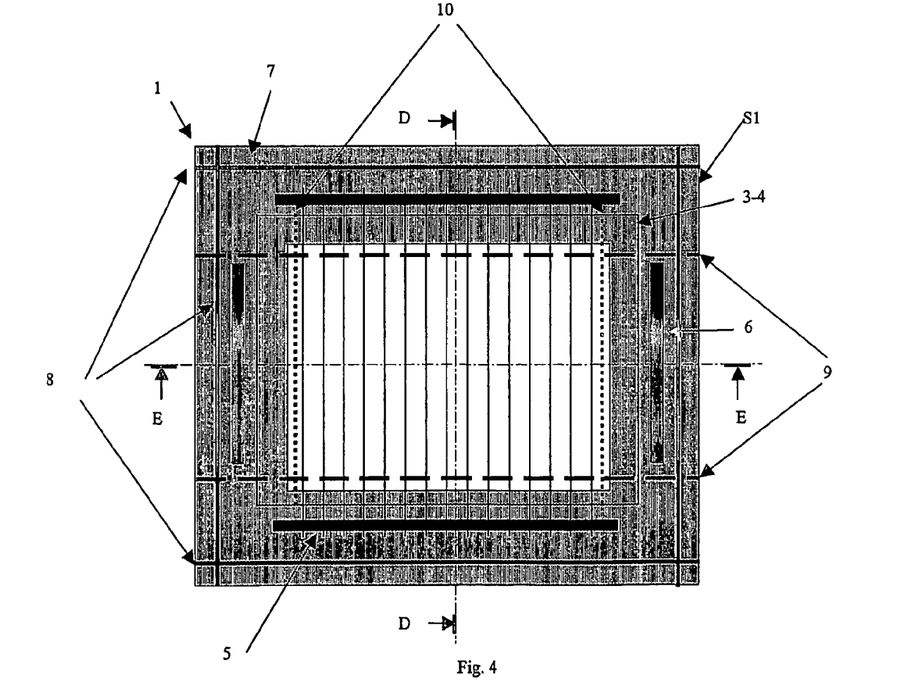
FIG. 4 is a front view of face 2 forming the subject of the invention, in the case of another embodiment, and revealing the laser ablation lines.
Figure 5:
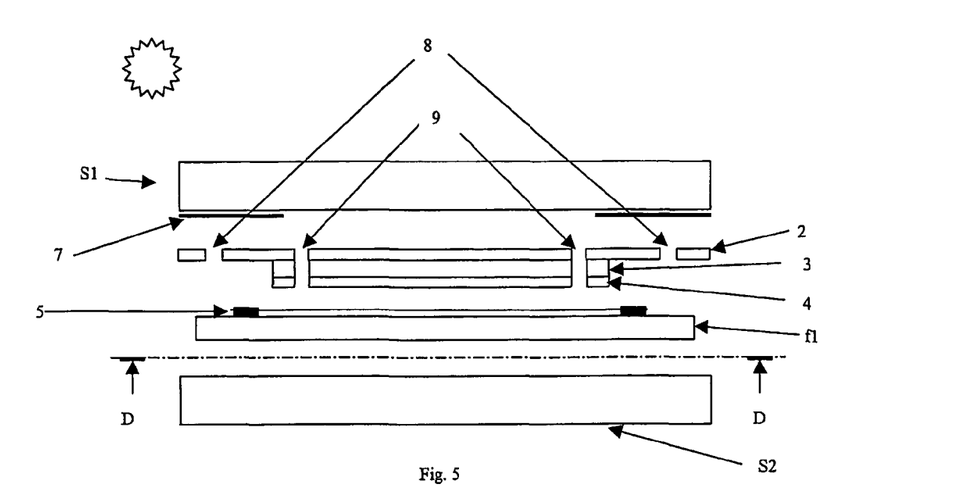
FIG. 5 is a sectional view on DD of FIG. 4.
Figure 6:
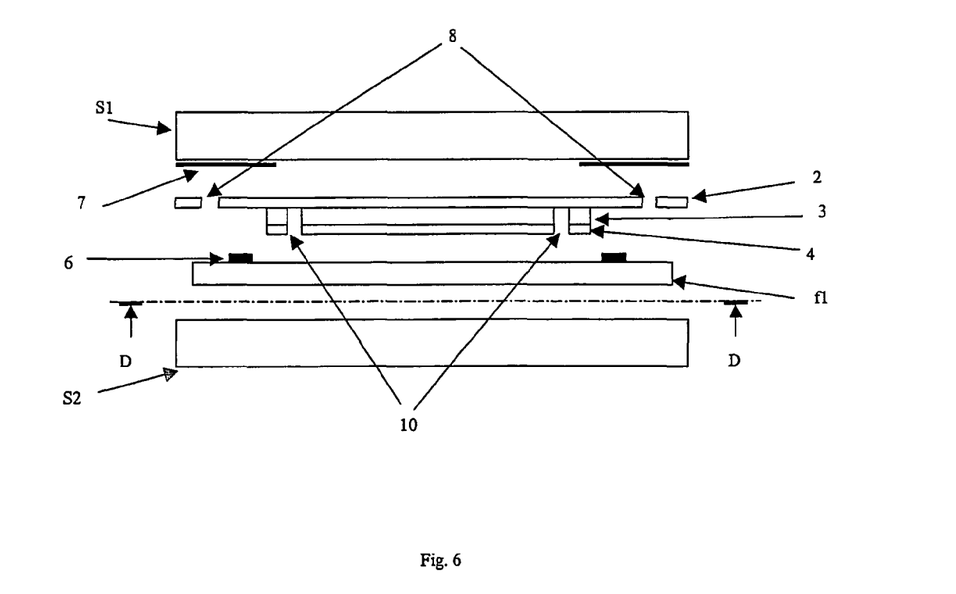
FIG. 6 is a sectional view on EE of FIG. 4.

According to another embodiment of the invention shown in FIGS. 4, 5 and 6, which differs from the embodiment shown in FIGS. 1, 2 and 3 by the fact that the ITO layer 2 covers the entire surface of face 2 (visible in FIG. 4).

To avoid short circuits between the various elements of the system, it is necessary to carry out a surface ablation operation on certain regions of the assembly, this ablation being carried out for example by a laser margining technique.

In particular, FIGS. 4, 5 and 6 show, by the reference numeral 8, laser ablation of just the ITO layer 2, so as to form an ITO peripheral region that is electrically isolated from the central region.

Moreover, FIGS. 4 and 5 show, by the reference numeral 9, laser ablation of the ITO layer 2, of the active multilayer 3 and the collector 4, so as to allow electrical supply without short-circuiting each of the collectors.

Finally, FIGS. 4 and 6 show, by the reference numeral 10, laser ablation of the active multilayer 3 and of the collector 4, so as to provide electrical isolation between the two current collectors.

The glazing assembly 1 incorporates electrical connectors that allow the active system to be controlled via a power supply. These electrical connectors are of the type used for heated windows.

According to other variants, the "all-solid-state" active multilayer 3 may be replaced with other families of polymer-type electrochromic systems.

Thus, for example, a first part, formed from a layer of electrochromic material, otherwise called active layer, made of poly(3,4-ethylenedioxythiophene) from 10 to 10000 nm, preferably 50 to 500 nm, in thickness—as a variant it may be one of the derivatives of this polymer—is deposited by known liquid deposition techniques (spray coating, dip coating, spin coating or casting), or else by electrodeposition, on a substrate coated with its lower or upper conducting layer forming the electrode (anode or cathode), or more generally the current lead. Whatever the polymer of which this active layer is made, this polymer is particularly stable, especially to UV, and operates by the injection/ejection of lithium ions ($Li^+$) or else $H^+$ ions.

A second part, acting as electrolyte and formed from a layer with a thickness of between 50 nm and 2000 μm, and preferably between 50 nm and 1000 μm, is deposited by a known liquid deposition technique (spray coating, dip coating, spin coating or casting), between the first and third parts, on the first part, or by injection moulding. This second part is based on a polyalkylene oxide, especially polyethylene oxide. As a variant, it may be an inorganic-type electrolyte based for example on hydrated tantalum oxide, zirconium oxide or silicon oxide.

This second electrolyte part deposited on the layer of active electrochromic material, which is itself supported by the glass or similar substrate, is then coated with a third part, the composition of which is similar to the first part, namely this third part is made of a substrate, coated with a current lead (conducting wires, conducting wires plus conducting layer, or just a conducting layer), this current lead itself being covered with an active layer.

In yet another embodiment, the resulting electrochromic active multilayer is based on a self-supporting polymer film. This self-supporting film is defined as follows: it is a polymer film that incorporates both the two layers of electrochromic material and the electrolyte, and exhibits its intrinsic mechanical properties (strength, rigidity, etc.).

In a first variant of this self-supporting film, it is based on a more complex system, called an interpenetrating network of molecules of 3,4-ethylenedioxythiophene (PEDT) or of its derivatives, and of a polyalkylene oxide.

One definition of an interpenetrating network (or IPN) is as follows: a matrix of at least two polymers crosslinked in each other. This is a polymer alloy that combines the properties of the polymers that make up the interpenetrating network. They are materials in which the sizes of the domains delimited by the entanglement of the crosslinked polymers is generally of the order of a few tens of nanometres.

In a second variation of this self-supporting film, it is based on a simple system, called a semi-interpenetrating network (semi-IPN), in which the 3,4-ethylenedioxythiophene molecules are polymerized in a polyalkylene oxide network (the electrolyte). The polyalkylene oxide network results, for example, from the radical copolymerization of a monofunctional polyethylene oxide (PEO) and of a bifunctional polyethylene oxide (PEO) in variable proportions and of variable length. The term "semi-interpenetrating network" refers to any matrix consisting of at least one polymer network and at least one second polymer entangled in the first network but not forming a second network.

Whatever the variant of this self-supporting film and depending on its conditions of formation, it is possible to obtain a plurality of film configurations ranging from a system comprising three well-defined layers (excluding the electrically conducting layers forming the electrodes) (namely two electrochromic layers separated by an electrolyte layer) that is similar in its construction to that obtained in the first embodiment containing a system whose interfaces are relatively diffused, or indeed more than a single layer exhibiting composition gradients. Nevertheless, the electronic conductivity of at least one of the active layers is sufficient to replace the conducting layers with an array of wires.

Thus, IPNs and semi-IPNs are produced, the compositions of which are for example the following:

The PEO/PC ratio is expressed as a percentage of the initial monomer. The percentage of PEDT is expressed relative to the percentage of PEO monomer. The composition of the PEO/PC network is in accordance with that of the initial monomer mixture. In contrast, the percentage of PEDT in the final network depends on the EDT monomer polymerization time. The thickness of the IPN or semi-IPN thus obtained is between 50 and 2000 μm and preferably between 250 and 500 μm.

In another embodiment of the active system, the multilayer 3 comprises an active system of the electroluminescent type.

A first family may be distinguished in which the organic electroluminescent material of the thin layer is made from evaporated molecules (OLEDs) such as for example the $AlQ_3$ complex (tris(8-hydroxyquinoline) aluminium), DPVBi (4,4'-(diphenylvinylenebiphenyl)), DMQA (dimethyl quinacridone) or DCM (4-(dicyanomethylene)-2-methyl-6-(4-dimethylaminostyryl)-4H-pyran). In this case, additional layers are associated with each of the faces of the thin film, which favour the transport of electrical carriers (holes and electrons); these additional layers are HTL (Hole Transporting Layer) and ETL (Electron Transporting Layer) layers. In addition, to improve the injection of holes into the HTL layer, the latter is combined with an HIL (Hole Injection Layer) consisting, for example, of copper or zinc phthalocyanine.

In a second family, the organic electroluminescent material of the thin film consists of polymers (pLEDs) such as, for example, PPV (poly(para-phenylenevinylene)), PPP (poly (para-phenylene)), DO-PPP (poly(2-decyloxy-1,4-phenylene)), MEH-PPV (poly[2-(2'-ethylhexyloxy)-5-methoxy-1, 4-phenylene vinylene)]), CN-PPV (poly[2,5-bis (hexyloxy)-1,4-phenylene-(1-cyanovinylene)]) or PDAF (poly(dialkylfluorene)); the polymer layer is also combined with a layer that favours the hole injection (HIL) consisting, for example, of PEDT/PSS (poly (3,4-ethylene-dioxythiophene/poly (4-styrene sulphonate)).

In a third family, the inorganic electroluminescent material consists of a thin film of, for example, sulphides such as Mn:ZnS or Ce:SrS or of oxides, such as $Mn:Zn_2SiO_4$, $Mn:Zn_2GeO_4$ or $Mn:Zn_2Ga_2O_4$. In this case, each of the faces of the thin electroluminescent layer is combined with an insulating layer produced from a dielectric material, for example $Si_3N_4$, $BaTiO_3$ or $Al_2O_3/TiO_2$.

In a fourth family, the inorganic electroluminescent material consists of a thick phosphor layer such as, for example, Mn:ZnS or Cu:ZnS, this layer being combined with an insulating layer made of a dielectric material, for example $BaTiO_3$, these layers generally being produced by screen printing.

Whatever the type of electroluminescent system—organic or inorganic, thin layer or thick layer, the multilayer comprising especially the electroluminescent layer is combined with two electrodes (a cathode and an anode in the case of organic systems).

These electrodes are similar to those already envisaged for the electrochromic-type active systems.

Likewise, at least one of the glass panes may be bulk-tinted, especially tinted in blue or green, grey, bronze or brown.

The substrates used in the invention may also be based on a polymer (PMMA, PC, etc.). It should also be noted that the substrates may have very varied geometrical shapes: they may be square or rectangular, but also any polygon or at least partly curved profile, defined by rounded or corrugated contours (round, oval, "waves", etc.).

One of the substrates forming the glazing assembly may be opaque, opacified or a mirror. The glazing assemblies may constitute a graphic and/or alphanumeric data display panel, a window for buildings, a rear view mirror, an aircraft windscreen or cabin window, or a roof window, interior or exterior glazing for buildings, a shop showcase or countertop, which may be curved, glazing for protecting an object of the painting type, an antiglare computer screen, or glass furniture.

Moreover, at least one of the two glass panes may be covered with a coating having another functionality (this other functionality possibly being, for example, a solar-protection multilayer, an anti-fouling multilayer or the like). As a solar-protection multilayer, this may be a thin-film multilayer deposited by sputtering and including at least one silver layer. It is thus possible to have combinations of the type:
S1/solar-protection layers/active system/thermoplastic/S2;
S1/active system/thermoplastic/S2.
S1/thermoplastic/active system/thermoplastic/S2.

The thermoplastic may be chosen from PVB, PU and EVA.

It is also possible to deposit the solar-protection coating not on one of the glass panes, but on a sheet of flexible polymer of the PET (polyethylene terephthalate) type.

For examples of solar-protection coatings, the reader may refer to Patents EP 826 641, EP 844 219, EP 847 965, WO99/45415 and EP 1 010 677.

However, without departing from the scope of the invention, certain adaptations may be noted according to the applications or uses of the invention.

Thus, for building applications, the current leads 5 may comprise not metal wires but, in this case, may be composed only of metal shins or other electrically conducting strips that will be placed in direct contact with the collector 4.

Moreover, in configurations in which lamination of two substrates S1 and S2 is required, one or other of the substrates may then be used for providing all of the specific functionalities, such as the solar-control or low-emissivity functions as described above, these being provided by multilayers deposited on face 1 or on face 4, or anti-fouling functions (hydrophilic, hydrophobic, self-cleaning coating) provided by materials deposited on face 1.

One particular application in which the lamination technique is used consists of active glazing intended for aviation.

After the substrate S1 has been toughened, the active system is deposited on face 2 of the said substrate. An ITO-based heating layer is deposited on face 3 of the substrate S2. This laminated glazing assembly incorporating an active system may be used with other aviation-type laminated glazing assemblies (without an active system), such as for example that according to the provisions of patent FR 2 766 651. It should be pointed out that the laminated glazing assembly incorporating the active system retains its functionalities at temperatures of around −50° C. and withstands pressure/vacuum cycles.

Another application in which the lamination technique is encountered consists of the field of toughened glazing for side windows or windscreens or rear windows or roofs. Such a structure according to the teachings of the invention is then integrated into the reinforced glazing configuration (refer to WO 01/000403 and FR 2 764 841).

Likewise, in a double-glazing configuration, the glazing that includes the active system in the following configuration: substrate (S1) active system/polymer f1/substrate (S2) may be mounted in a double-glazing assembly, in particular for use in the building sector.

The glazing assembly that includes the active system is then combined with a gas-filled cavity (the gas being dry air, argon or argon/air mixture, using known techniques) and with a second glass or even with a second laminated glass assembly. The two glass assemblies are separated by a metal spacer (typically based on aluminum) that includes dehydrating agents or by an organic spacer that includes dehydrating agents that are combined with sealing mastics and sealants. The gas-filled cavity is typically between 6 mm and 20 mm in thickness. The glass panes have a thickness of between 4 mm and 25 mm. The glass panes may be toughened in order to meet the safety standards specific to each application. They may be clear, bulk-tinted or covered with an opacifying coating over part of their surface, in particular for aesthetic purposes. The lamination is carried out by a known hot compression assembly technique using one or more transparent, coloured or opalescent PVB sheets 0.38 mm or 0.76 mm in thickness placed between the glass panes. The second glass pane or the second laminated glass assembly may provide additional functions, such as solar-protection functions, low-emissivity functions, acoustic damping or decoration functions.

Solar-protection and low-emissivity functions are conventionally provided by thin-film multilayers generally based on silver, which are deposited on the glass face which is in contact with the gas cavity of the double-glazing unit. The solar-protection function may also be provided by multilayers of the TCO/metal/TCO type deposited on a sheet of polymer of the PET type or by a multilayer of polymer sheets, these then being incorporated by lamination into the second laminated glass assembly.

The acoustic damping functions are provided by a PVB that has undergone a specific treatment in order to improve the acoustic properties of the laminated glass pane (such as the laminated products sold under the name SGG Stadip Silence).

It is thus possible to have the following double-glazing configurations:
substrate S1/active system/f1/S2//gas cavity//multilayer with a solar-protection or low-emissivity function/glass;

substrate S1/active system/f1/substrate S2/gas cavity//glass/PVB/multilayer with solar-protection function/PVB/glass;

substrate S1/active system/f1/substrate S2//gas cavity//solar-protection layer or layer with a low-emissivity function/glass/PVB/glass; and substrate S1/active system/f1/substrate S2/gas cavity//glass/PVB/glass.

Anti-reflection functions may be provided on all the faces of the glass substrates that are in contact with gas (external air, internal air or gas cavity of the double-glazing) or on only certain faces, depending on the desired optical appearance.

The invention as described above offers many advantages:

it makes it possible to obtain a safety glazing assembly of simplified structure. The glazing assembly forming the subject of the invention essentially comprises two substrates that sandwich an active multilayer. Previously, to comply with the safety standards, the use of a glazing assembly consisting of three substrates is required, a so-called three-glass assembly. Moreover, the deposition on face 2 of the active multilayer 3 makes it possible to dispense with the deposition of a solar-protection layer for the active multilayer, the TCO layer being sufficiently reflective with respect to infrared radiation.

The invention claimed is:

1. A glazing assembly, comprising:
a first rigid upper substrate with a solar protective layer positioned on the outer face of the first rigid protective layer that faces outside towards the sun;
at least one active system positioned on the inner face of the first rigid substrate, the at least one active system comprising a multilayer, comprising at least one thin film;
a second rigid lower substrate positioned below the at least one active system; and
at least one polymer film positioned between the active system and the second rigid substrate, the polymer film comprising a function of retaining fragments of the glazing assembly should the glazing assembly break.

2. The glazing assembly according to claim 1, wherein the active system comprises an electrically controllable system comprising variable optical properties, variable energy properties, or a combination thereof, wherein the electrically controllable system is at least one system selected from the group consisting of an electrochroinic system, an optical valve, a viologen-based system, a liquid-crystal system, and an electroluminescent system.

3. The glazing assembly according to claim 1, wherein the active system comprises a thin film or a thin-film multilayer with a thermal function, of the low-emissivity or solar-protection type, an acoustic function, of the acoustic attenuation coating type, or an optical function, of the decorative or absorbent, thermochromic or thermotropic type.

4. The glazing assembly according to claim 1, wherein the substrates and are made of glass.

5. The glazing assembly according to claim 1, wherein the total thickness ($e_{1+2}$) of the substrates and of all the materials placed between them is less than or equal to 8 mm.

6. The glazing assembly according to claim 1, wherein the total thickness ($e_{1+2}$) of the substrates and of all the materials placed between them is less than or equal to 30 mm.

7. The glazing assembly according to claim 1, wherein the substrates and have substantially identical shapes and substantially identical dimensions.

8. The glazing assembly according to claim 1, wherein the substrates and have different dimensions and substantially identical shapes.

9. The glazing assembly according to claim 1, wherein the glazing assembly further comprises an opacifying peripheral coating, wherein the opacifying peripheral coating is of a screen-printed type, and wherein the opacifying peripheral coating is applied to at least one part of the glazing assembly selected from the group consisting of around the periphery of an inside face of the first substrate, around the periphery of an outside face of the second substrate, and around the periphery of an inside face of the second substrate.

10. The glazing assembly according to claim 1, wherein the glazing assembly further comprises at least one margining line positioned on the periphery of an inside face of the first substrate, on the periphery of an outside face of the second substrate, or a combination thereof.

11. The glazing assembly according to claim 1, wherein the glazing assembly further comprises a first peripheral seal in contact with the facing faces of the substrates.

12. The glazing assembly according to claim 11, wherein the glazing assembly further comprises a second peripheral seal in contact with the edges of the substrates.

13. The glazing assembly according to claim 12, wherein the first and second peripheral seals are formed by extrusion or encapsulation.

14. The glazing assembly according to claim 12, wherein the second peripheral seal is flush with the outer face of the first substrate.

15. The glazing assembly according to claim 12, wherein the first peripheral seal, the second peripheral seal, or the first and the second peripheral seal, at least partly fill an open peripheral groove defined by a recess between the two substrates.

16. The glazing assembly according to claim 12, wherein the first peripheral seal, the second peripheral seal, or the first and second peripheral seals are penetrated by connection elements of the active system, at least partly comprise mechanical reinforcement elements, or a combination thereof.

17. A method of forming an article comprising, forming the article with the glazing assembly of claim 1; wherein the article is selected from the group consisting of a window, a sunroof, a skylight, a display panel, a display case, and a piece of furniture.

18. The glazing assembly according to claim 1, wherein the glazing assembly passes the safety tests of the ECE R43 and ANSI Z26.1. standards.

19. The glazing assembly according to claim 1, wherein the glazing assembly comprises at least one transparent substrate of polygonal shape, wherein the at least one transparent substrate is curved or partially curved.

20. The glazing assembly according to claim 1, wherein the glazing assembly comprises an opaque, opacified or mirror substrate.

* * * * *